No. 763,402. PATENTED JUNE 28, 1904.
E. A. JOHNSTON.
ATTACHMENT FOR MOWING MACHINES.
APPLICATION FILED FEB. 10, 1904.
NO MODEL. 5 SHEETS—SHEET 1.
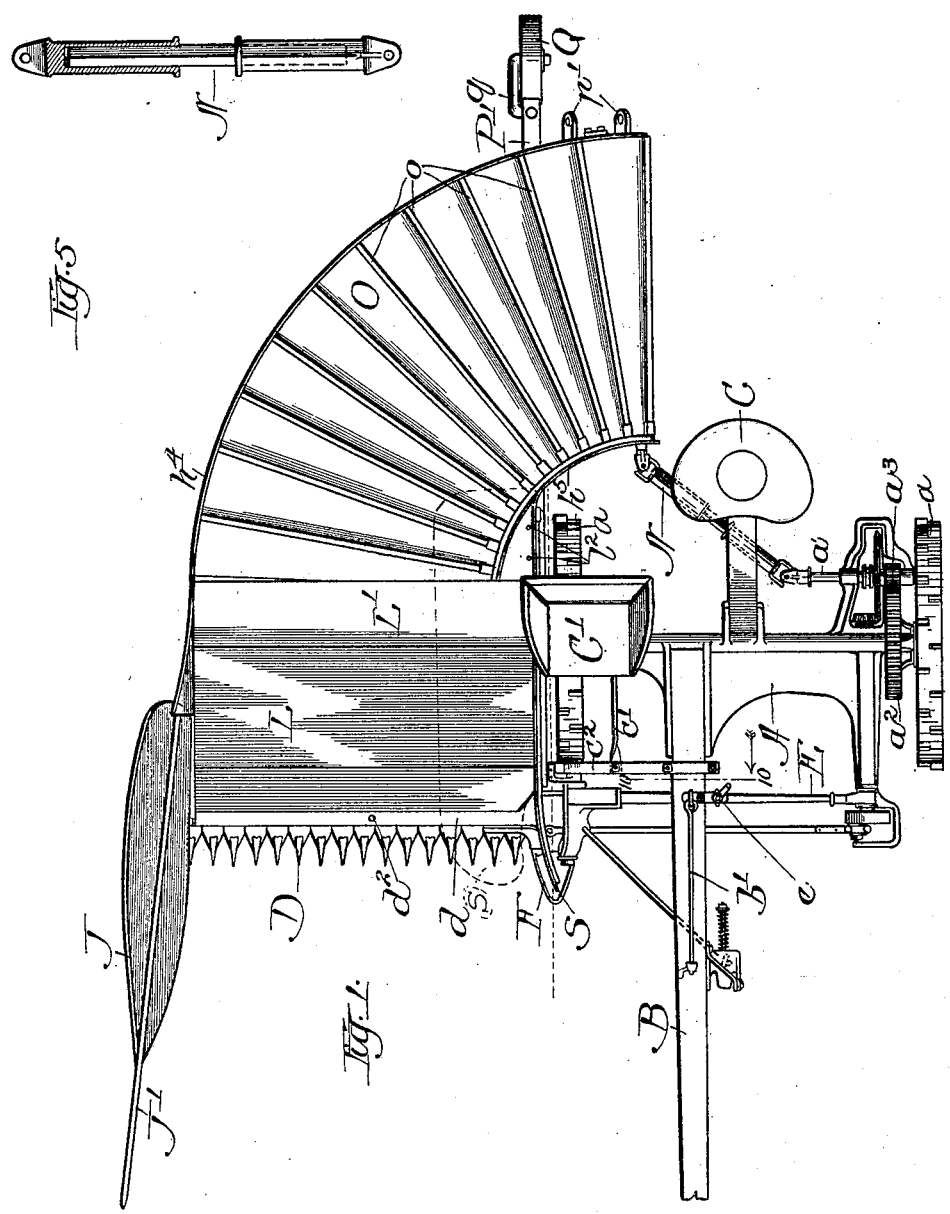
Witnesses:
T. H. Alfreds
Margaret A. Sweeney.
Inventor:
Edward A. Johnston.
By J. C. Warnes.
Atty.

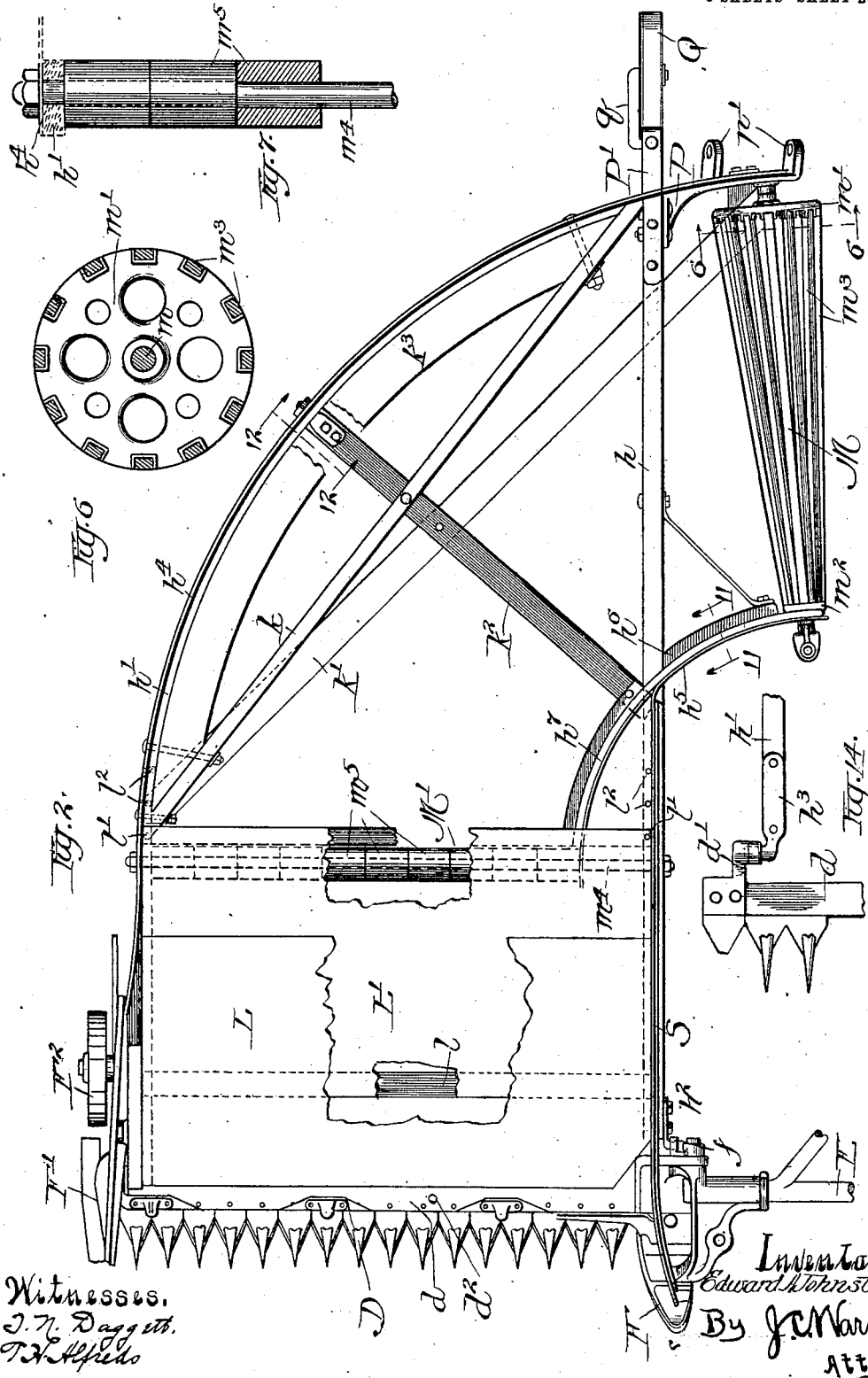

No. 763,402. PATENTED JUNE 28, 1904.
E. A. JOHNSTON.
ATTACHMENT FOR MOWING MACHINES.
APPLICATION FILED FEB. 10, 1904.
NO MODEL. 5 SHEETS—SHEET 3.
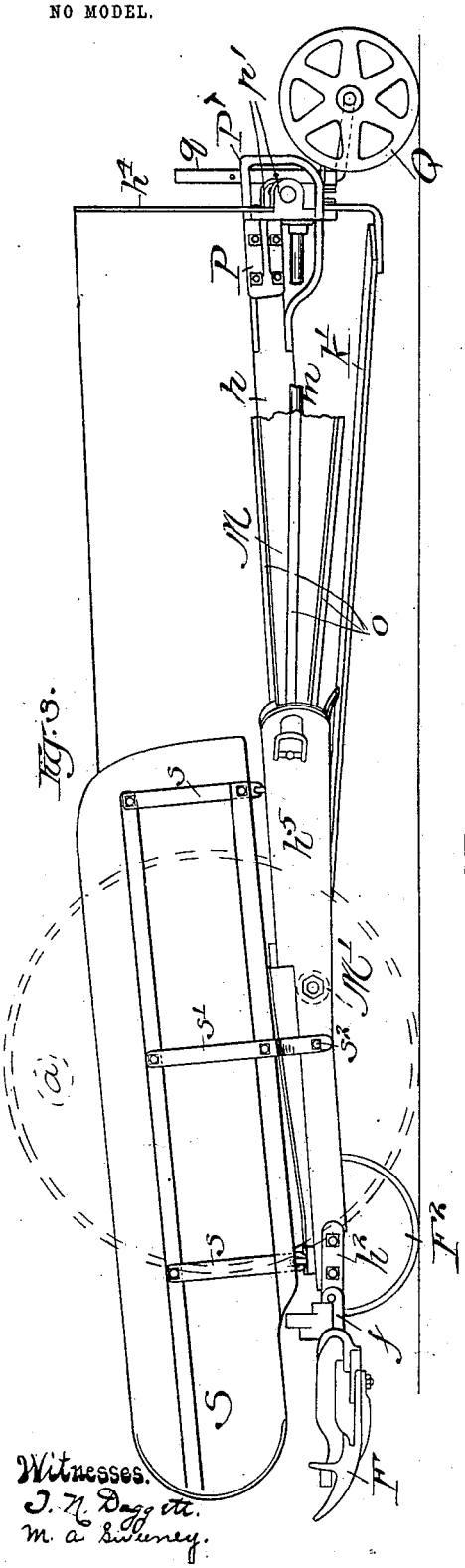
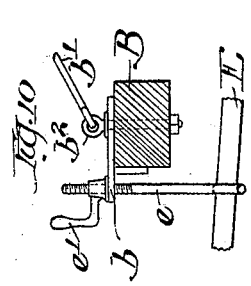
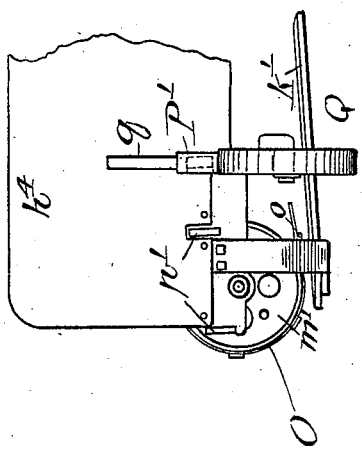
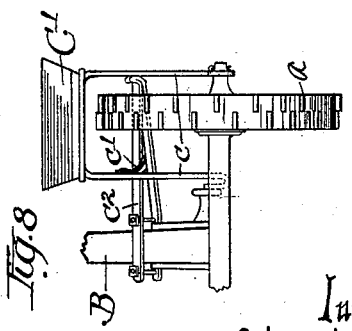
Witnesses.
J. N. Daggett.
M. A. Sweeney.
Inventor.
Edward A. Johnston
By J. C. Warnes
Atty.

No. 763,402. PATENTED JUNE 28, 1904.
E. A. JOHNSTON.
ATTACHMENT FOR MOWING MACHINES.
APPLICATION FILED FEB. 10, 1904.
NO MODEL. 5 SHEETS—SHEET 4.
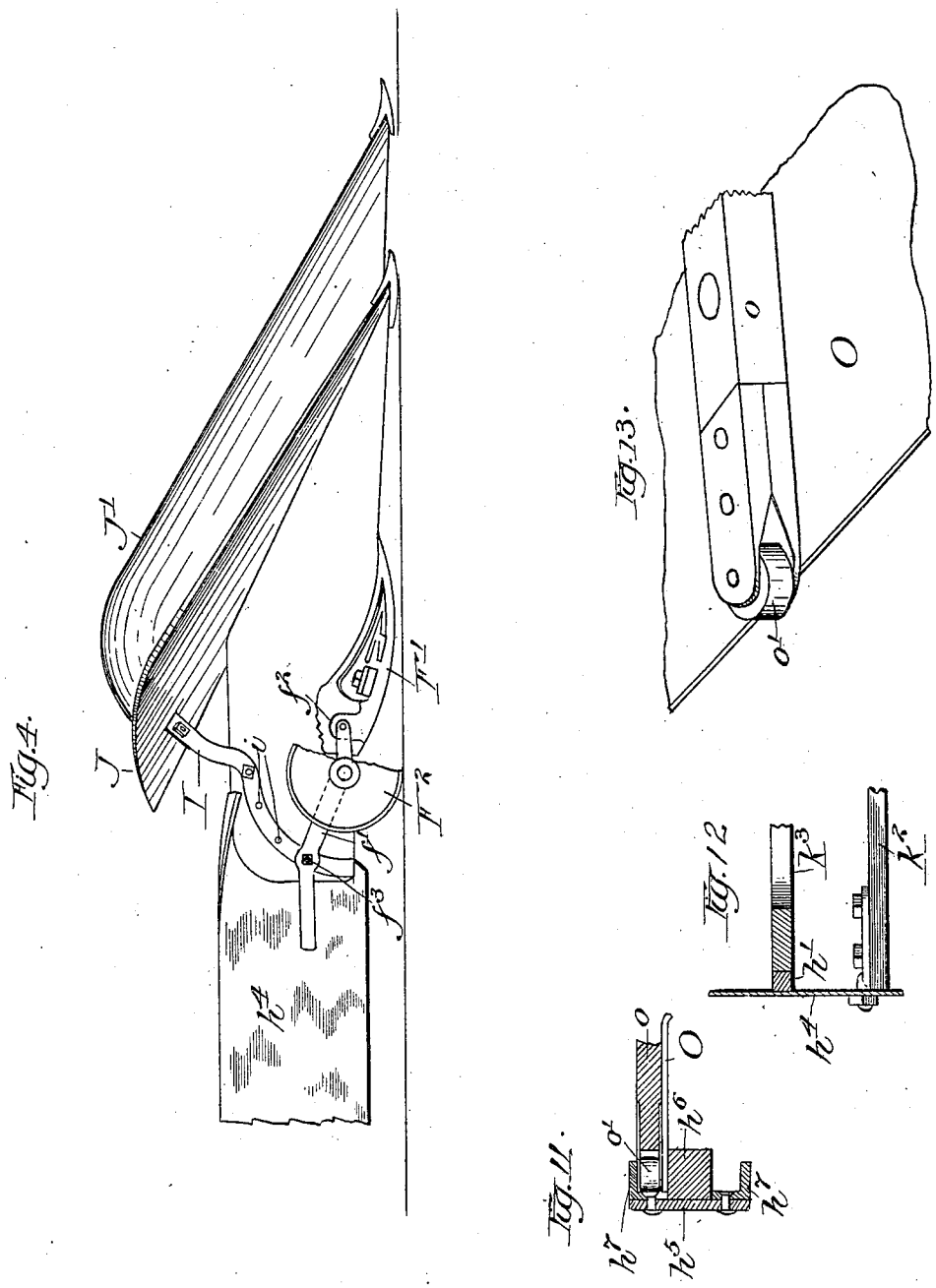
Witnesses.
J. N. Daggett.
M. A. Sweeney.
Inventor.
Edward A. Johnston
By J. C. Warnes.
Atty.

No. 763,402. PATENTED JUNE 28, 1904.
E. A. JOHNSTON.
ATTACHMENT FOR MOWING MACHINES.
APPLICATION FILED FEB. 10, 1904.
NO MODEL. 5 SHEETS—SHEET 5.
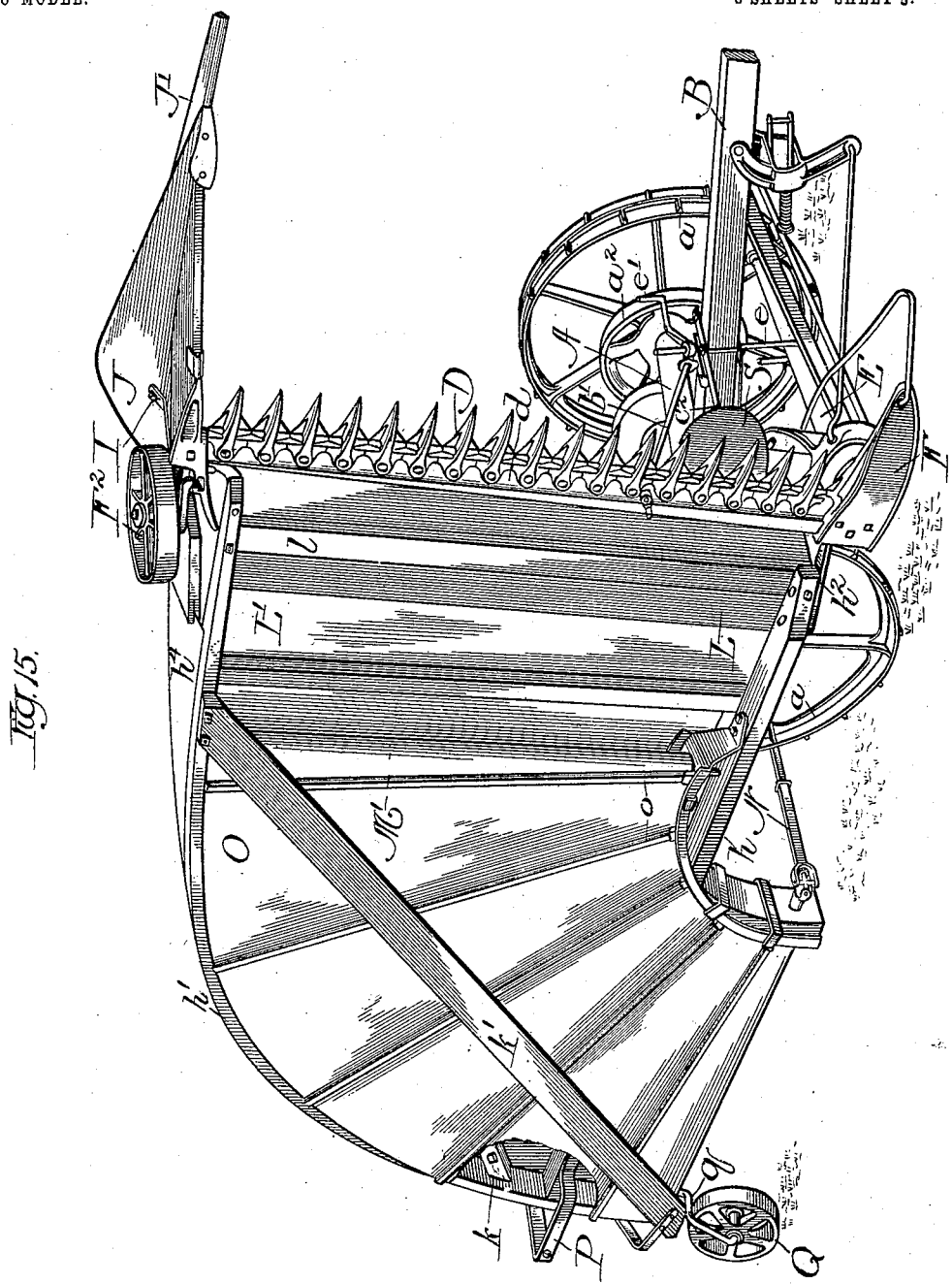

No. 763,402.

Patented June 28, 1904.

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS.

ATTACHMENT FOR MOWING-MACHINES.

SPECIFICATION forming part of Letters Patent No. 763,402, dated June 28, 1904.

Application filed February 10, 1904. Serial No. 192,932. (No model.)

*To all whom it may concern:*

Be it known that I, EDWARD A. JOHNSTON, a citizen of the United States, residing at Chicago, in the county of Cook and State of Illinois, have invented a new and useful Improvement in Attachments for Mowing-Machines, of which the following is a complete specification.

This invention relates to side-delivery devices to be used in connection with mowing-machines when cutting grass or grain, the function of the device being to effect the delivery of the material cut by the machine immediately in the rear thereof.

The purpose of this invention is to provide a simply-constructed and readily-operated attachment that will enable the grain or grass to be deposited in consecutive bunches or gavels in the rear of the machine and in a position that will not interfere with passing of the team or machine in the succeeding round.

The improvement viewed otherwise may be regarded as a device to aid in the manual discharge of the material cut either in bunches or in swath in the rear of the machine or as means located in the rear of the cutting apparatus for imparting a diagonally rearward movement to the cut grain.

Further subordinate objects will appear in the disclosure of this invention, which has been embodied and illustrated in the accompanying drawings, in which—

Figure 1 is a plan view of a mower, showing the attachment forming the subject-matter of this invention in connection therewith. Fig. 2 is an enlarged plan of the attachment and the cutting apparatus of the mower, the endless canvas or apron being removed to more clearly present the construction of the frame of said attachment. Fig. 3 is a stubble-side elevation substantially of those parts shown in the plan view of Fig. 2. Fig. 4 is a grain-side elevation of the cutting apparatus with a portion of the platform connected therewith, showing the method of supporting and adjusting the grainward end of the said platform and cutting apparatus. Fig. 5 is a detail, partly in section, showing the construction of the driving member connecting the driving roller or drum of the attachment with the cross-shaft of the mower. Fig. 6 is an enlarged section of the conical driving-drum as indicated by the line 6 6 of Fig. 2. Fig. 7 is a fragmentary view, partly in section, of the sectional roller at the receiving or upper end of the endless conveyer. Fig. 8 is a fragmentary view of the frame of the mower, showing the location and method of supporting the supplementary seat. Fig. 9 is a rear elevation showing the caster-wheel which supports the rear end of the platform and parts adjacent to the caster-wheel. Fig. 10 is a section, as indicated by the line 10 10 of Fig. 1, in which is shown the supporting means of the coupling-frame when in a raised position. Fig. 11 is a sectional view of the inner wall of the platform, taken as indicated by the line 11 11 of Fig. 2, showing the manner of guiding the endless conveyer and the antifriction-rollers on the ends of the slats of said conveyer. Fig. 12 is a section through the outer wall of the platform as indicated by the line 12 12 of Fig. 2. Fig. 13 is an enlarged detail in perspective, setting forth the construction of the antifriction-rollers on the slats of the endless conveyer. Fig. 14 is a detail plan view showing the manner of connecting the frame of the platform to the finger-bar of the cutting apparatus. Fig. 15 shows a mower with the improved attachment in connection therewith, the cutting apparatus and attachment being shown in a folded position.

The attachment consists, essentially, of a frame on which is supported a fixed table or platform for the initial reception of the grain and a quadrantal-shaped endless conveyer immediately in the rear thereof.

The type of mower to which the attachment may be applied is not material, and the one shown is of a common type, in which A is the main frame, and $a$ and $a$ the supporting and driving wheels therefor. B is the tongue, C the operator's seat, and C' the supplemental seat for the attendant, who moves the cut grain, &c., back from the cutting apparatus D. E is the coupling-frame, and F the inner shoe. $a'$ is the cross-shaft, driven through the gear $a^2$ and the pinion $a^3$, to which the said shaft is secured. Further details of the several parts of the mower are not regarded as material, since they in no wise affect the manner of operating the attachment.

The principal members of the frame of the attachment are the beam $h$, which forms the stubbleward side of the longitudinally-extending portion of the platform and constitutes the main supporting element, and the long strip $h'$, curved stubbleward at its rear end to meet the beam $h$, with which it is connected. The forward end of the beam $h$ pivotally connects to a lug $f$ on the shoe F by means of the strap $h^2$, and the forward end of the strip $h'$ (see Fig. 14) forms a similar pivotal connection with the finger-bar $d$ by means of the strap $h^3$, engaging the arm $d'$, which is secured to the said finger-bar. The frame thus formed is made rigid by the diagonal braces $k$, $k'$, and $k^2$, while the strip $h'$ is strengthened by the correspondingly-curved reinforcing-plate $k^3$, all of which are clearly shown in Fig. 2.

Secured to the strip $h'$ is a sheet-iron plate forming the outer wall $h^4$ for a portion of the length of the receiving or primary platform and a wall for the full length of the quadrant-shaped frame of the endless conveyer. Concentric with the outer wall $h^4$ is the inner wall $h^5$, secured to a strip $h^6$, forming a construction similar to the said outer wall, with the addition, however, of the angle-irons $h^7$ at the top and bottom which serve as guides for the endless apron. The width of this quadrant-shaped platform is shown to be somewhat less than the width of the primary platform; but this is merely by preference, as any width can be given sufficient to enable it to meet the requirements for which it was designed—viz., to convey the material from the primary platform diagonally rearward and deposit it in the rear of the machine.

The outer end of the cutting apparatus and the platform-frame is supported by means of the grain-wheel $F^2$, (see Fig. 4,) which journals on a suitable bearing on the lever $f'$. This lever $f'$ is pivotally connected at its forward end to an upwardly-projecting lug $f^2$ on the outer shoe $F'$ of the cutting apparatus and is provided with an aperture near its free end which is adapted to register with a series of apertures $i$ in the brace I. The bolt or pin $f^3$ secures the said lever $f'$ to the brace I in any desired position. On the upward extension of the brace I is supported the rear end of the divider-board J, to which in turn is secured the supplemental divider-board $J'$.

Lying immediately in the rear of the cutting apparatus and between the walls of the platform is the rectangular plate L, preferably of sheet metal, and on this is first deposited the grain or grass after being cut. Extending from the forward end of the quadrant-shaped platform to a point beneath the said plate L is the forwardly and rearwardly adjustable plate $L'$, strengthened by the rib $l$ on its forward edge. This plate $L'$ terminates at its rear edge above the said quadrant-shaped platform and in either side of said plate is the aperture $l'$, which can be made to register with one of a number of apertures $l^2$ in the supports for said plate. Small bolts engaging the apertures secure the plate $L'$ in the desired position. This will enable the plate $L'$ to be moved forward for the short grain and rearward for the long grain, as circumstances may require.

In suitable supports at the rear of the quadrant-shaped platform is mounted a conical-shaped drum M, driven by means of the universal extensible connection N, (see Figs. 1, 2, and 5,) connecting with the cross-shaft $a'$, above referred to. This drum M is a conical frustum and consists, preferably, of a shaft $m$, to which are secured the large and small circular heads $m'$ and $m^2$. These heads $m'$ and $m^2$, of diameters corresponding to the relative lengths of the outer and inner walls of the platform, are provided with a series of notches in the peripheries thereof, (see Fig. 6,) in which are secured the ends of the slats $m^3$, connecting the two heads. This construction will result in a drum which is very light, and the slats will operate to give it a good gripping action on the endless apron passing thereover.

$M'$ is a sectional roller located at the forward end of the quadrantal-shaped platform. This roller is comprised of a series of comparatively short sections $m^5$, the individual sections being of substantially uniform diameter and free to rotate independently upon a common shaft $m^4$. An endless conveyer O, provided with a series of slats $o$, is thrown about the drum M and the sectional roller $M'$, the canvas being made of a form to fit the platform. With such an arrangement there is a manifest tendency for the canvas to slip inward or toward the smaller end of the drum M. The inner wall $h^5$ serves as a guide to hold the canvas to its proper course and prevent such movement. To reduce the friction incident to the contact between the ends of the slats $o$ and the wall $h^5$, antifriction-rollers $o'$ are placed on the ends of the slats, as shown in Figs. 11 and 13.

P is a casting which serves as a connecting means between the beam $h$, the rear wall of the platform $h^4$, and other parts. $p'$ $p'$ are two lugs projecting rearward from the said casting P, as shown in Figs. 2, 3, and 9. In these lugs are apertures in alinement with each other and on a line substantially transverse to the vertical axis of the caster-wheel Q. These apertures are adapted to receive the vertical axis $q$ of the said caster-wheel when the platform is folded to a vertical position, so that the wheel is thus made to serve as a support for the platform in both normal working and folded positions. The support for the pivotal axis $q$ of the caster-wheel is formed by the U-shaped bar $p'$, the arms of which are secured to the beam $h$, as indicated in Fig. 3.

S is the inside divider, extending rearwardly and terminating at a point substantially above the junction of the beam $h$ of the platform-frame with the inner wall $h^5$ of the platform. The uprights $s\ s$, as shown in Fig. 3, pivotally connect with the frame of the platform, and the intermediate upright $s'$ extends downward and is secured to the wall $h^5$ by means of the bolt $s^2$, thus rigidly securing the said divider in a vertical position. When it is desired to fold the divider to a position indicated by the dotted lines in Fig. 1, the bolt $s^2$ is removed, after which the divider will be free to be brought to a horizontal position ready for the folding of the platform.

The supplemental seat C' is mounted upon the supports $c$ and is braced by means of the bar $c'$. (See Figs. 1 and 8.) Extending from the tongue B to a proper position in front of the seat C' is a foot-support $c^2$.

To hold the coupling-frame and inner shoe from the ground when the platform is raised to a folding position, a rod $e$, threaded at its upper end, is secured to the coupling-frame E, as shown in Fig. 10. The rod $e$ is adapted to engage an aperture in the plate $b$ on the tongue B. The hand-nut $e'$ is then turned, which causes the coupling-frame to be raised any desired amount. When the platform is folded to a vertical position, the rod $b'$, which is connected by means of the eyebolt $b^2$ to the tongue B, is made to engage the aperture $d^2$ in the finger-bar $d$ of the cutting apparatus and sustain it in this elevated position.

The operation of the device is obvious. When in the opinion of the attendant a sufficient amount of grain or grass has accumulated on the primary platform formed by the plates L and L', he rakes it rearward until the bunch is engaged by the continuously-moving endless apron O of the quadrant-shaped conveyer. This apron conveys the bunch of cut material rearward and stubbleward, depositing it in the rear of the machine.

What I claim as my invention, and desire to secure by Letters Patent, is—

1. In an attachment for mowers, the combination of a rearward-extensible primary platform on which the cut material accumulates and an endless conveyer located adjacent to the rear edge thereof for conveying and depositing the said material rearward and stubbleward when placed thereon, substantially as described.

2. In an attachment for mowers, the combination of a rearward-extensible primary platform on which the cut material accumulates and a quadrantal-shaped endless conveyer located adjacent to the rear edge thereof for conveying and depositing the said material rearward and stubbleward when placed thereon, substantially as described.

3. In an attachment for mowers, the combination of a primary platform comprised of a forward fixed section and a movable section adjustable forwardly and rearward relative to said fixed section and an endless conveyer located adjacent to the rear edge of the said movable section for conveying and depositing the said material rearward and stubbleward when placed thereon, substantially as described.

4. In an attachment for mowers, the combination of a primary platform comprised of a forward fixed section and a movable section adjustable forwardly and rearward relative to said fixed section and a quadrantal-shaped endless conveyer located adjacent to the rear edge thereof for conveying and depositing the said material rearward and stubbleward when placed thereon, substantially as described.

5. In an attachment for mowers, the combination of a primary platform on which the cut material accumulates and a conveyer located adjacent to the rear edge thereof said conveyer comprising a quadrantal-shaped platform-frame, a conical driving-drum disposed longitudinally with respect to the line of advance of the machine on the stubble side of said frame, a transversely-disposed sectional roller located at the forward end of said frame, and an endless apron passing about said conical driving-drum and sectional roller, substantially as described.

6. In a mower, in combination, a finger-bar pivoted at its inner end to fold upward and inward, a platform-frame pivotally connected therewith, a quadrantal-formed endless conveyer provided with a driving-drum mounted on said frame, driving means for said endless conveyer comprising a flexible extensible connection extending from a moving part of said mower to the driving-drum of said conveyer thereby permitting the said platform-frame to be folded to a vertical position without interfering with the said driving means, and a caster-wheel for supporting the rear end of said platform, substantially as described.

7. In a mower, in combination, a finger-bar pivoted at its inner end to fold upward and inward, a platform-frame pivotally connected therewith, a quadrantal-formed endless conveyer provided with a driving-drum mounted on said frame, driving means for said endless conveyer comprising two square apertured caps having universal pivotal connection one with the driving-drum of said conveyer and one with the cross-shaft of said mower and a square shaft engaged by and connecting the said caps thereby permitting the said platform-frame to be folded to a vertical position without interfering with the said driving means, and a caster-wheel for supporting the rear end of said platform, substantially as described.

8. In an attachment for mowers, in combination, a primary platform on which the cut material accumulates, a quadrantal-formed platform in the rear thereof, a conical-shaped driving-drum located at the rearward and stubbleward side thereof, the said driving-drum being of a length substantially the same as that of the endless apron passing thereover, a roller consisting of a series of short sections of substantially uniform diameter journaled upon a common shaft, said shaft being located immediately in the rear of said primary platform, and an endless apron passing about said driving-drum and sectional roller, substantially as described.

9. In an attachment for mowers, in combination, a primary platform on which the cut material accumulates, a quadrantal-formed platform having inclosing walls, a conical-shaped driving-drum located at the rearward and stubbleward side thereof, a roller consisting of a series of short sections of substantially uniform diameter journaled upon a common shaft and an endless apron passing about said driving-drum and sectional roller, said apron provided with a series of slats on the inner ends of which are secured antifriction-rollers adapted to bear against the inner wall of said platform, substantially as described.

10. In an attachment for mowers, the combination of a primary platform on which the cut material accumulates and a quadrantal-formed conveyer comprising a conical-shaped driving-drum of a length substantially the same as the width of the conveyer said driving-drum located at and supporting the delivery end of the endless apron passing thereover, a transversely-disposed sectional roller located at and supporting the receiving end of the endless apron and an endless apron passing over said driving-drum and sectional roller, substantially as described.

11. In a mowing-machine, in combination with the cutting apparatus thereof adapted at its inner end to fold upward and inward, a platform pivotally secured to said cutting apparatus and adapted to fold therewith, means for supporting and sustaining jointly the cutting apparatus and the forward end of the said platform when either in a normal working or a folded position, and a caster-wheel for supporting the rear end of the platform either in its normal working or in its folded position, substantially as described.

12. In a mowing-machine, in combination with the cutting apparatus thereof pivoted at its inner end to fold upward and inward, a platform pivotally secured to said cutting apparatus and adapted to fold therewith, means for supporting and sustaining jointly the cutting apparatus and the forward end of the said platform when in either a normal working or in a folded position, and independent means for supporting the rear end of said platform, said supporting means comprising a caster-wheel, an axle for said caster-wheel provided with a vertically-disposed stem and bearings secured to the rear end of said platform, said bearings adapted to receive the stem of said caster-wheel axle when the platform is either in a normal working or in a folded position, substantially as described.

13. In a mowing-machine, in combination with the cutting apparatus thereof adapted at its inner end to fold upward and inward, a platform pivotally secured to said cutting apparatus and adapted to fold therewith, means for supporting and sustaining the cutting apparatus and the forward end of the said platform when in either a normal working or in a folded position, and independent supporting means for the rear end of said platform said supporting means comprising a caster-wheel an axle for said wheel having a vertically-disposed stem in connection therewith and independent transversely-extending bearings secured to said frame for receiving the stem of said caster-wheel axle thereby enabling the said caster-wheel to support the rear end of said frame either in its normal working or in its folded position, substantially as described.

EDWARD A. JOHNSTON.

Witnesses:
RAY D. LEE,
A. E. CHADWICK.